Patented Aug. 9, 1932

1,870,881

UNITED STATES PATENT OFFICE

ALFRED M. THOMSEN, OF SAN FRANCISCO, CALIFORNIA

TREATMENT OF WHITE WATER PRODUCED IN PULP AND PAPER MAKING

No Drawing.  Application filed April 6, 1931. Serial No. 528,246.

This invention relates to a process for the treatment of "white water," produced in pulp and paper making, whereby I effect a saving of such materials now constantly being lost in present day manufacturing practices. By the use in a closed circuit of certain metallic compounds, later herein described, I am able to obtain from the same amount of raw materials being treated a greater percentage of finished products than is now possible under the practice of extant processes; to prevent almost entirely stream pollution; to render operating and mill circuit conditions acid or alkaline, oxidizing or reducing, as desired; and generally to retain a more complete control over various other conditions pertinent to the pulp and paper making industry.

In the parlance of the paper maker, "white water" is water containing small amounts of suspended pulp. It is produced whenever pulp is passed through a screen, the fibers theoretically remaining upon the screen and the water passing through. In practice, however, the result is far different. A few long fibers slip through the screen meshes before a "web" of fiber is formed and short fiber passes through quite freely. Very fine pulp, loading materials, such as clay, etc., and the products of size and alum treatment, being in exceedingly minute division, pass through even when a mat of fiber has been built upon the supporting wire. The milky water thus discarded is aptly termed "white water." Its disposal is one of the unsolved problems of paper making. Some white water is returned to the circuit as wash and diluting water, and such utilization is of course perfect, but much remains as a waste product entailing considerable loss and often causing trouble by stream pollution. The "over-all" loss of paper making materials is very large when we consider that it issues from the groundwood department, from the chemical pulp department, and finally from the machine-room itself.

The use of save-alls having screens as the means of treating white water is of very limited application, such installations being capable of returning little except the longer fiber which by accident or design is allowed to enter the white water course. Settlers have found some application, but the enormous size of the tanks required, due to the slow and unsatisfactory settling of the suspended solids and general difficulties, practically limits their use to the paper machines operating on heavily loaded papers, where the recovery of such loading materials rather than pulp is the object sought. Filtration has likewise been attempted, but the slimy nature of the suspended solids and the enormous volumes of water that must be handled has relegated this system to about the same place as that of the settlers in the present state of the industry.

I have overcome the difficulties inherent in these various schemes of white water disposal by radically changing the character of the white water. I accomplish this by adding either to the white water, after it has passed through the mill, or while it is still a part of the mill circuit, a sufficient quantity of a soluble salt of a metal having an insoluble hydroxide. "White water" so treated permits of exceedingly rapid separation of the bulk of the water from the suspended solids by either decantation, or filtration, or a combination of both. In the event that the character of the water, or of the paper or pulp being made, is such that the addition of said metallic salt does not cause rapid enough separation to make the operation commercial, then, and in that event, a soluble hydroxide may also be added. Interaction now takes place between the unused portion of the added metallic salt and the soluble hydroxide, whereby the separation before described is facilitated. The meaning of the word "insoluble hydroxide" cannot be taken literally, for, of course, there is no such substance as an absolutely insoluble hydroxide. The expression is adopted to make a distinction between such soluble hydroxides as those of calcium, barium, strontium, sodium, potassium, etc., on one hand, and the insoluble hydroxides of copper iron, tin, zinc, magnesium and lead on the other. It is true that solubilities in water of the hydroxides of zinc and magnesium are generally given at 5 to 10 parts per million, and the hydroxide of lead at about one in 10,000 parts, yet for the purpose of classification herein considered anything less soluble than the last named hydroxide is considered as an "insoluble".

In view of the fact that water and wood vary all over the world, that there are many types of pulp, and that the modifications of paper are legion, it follows that the type, kind, and quantity of reagents may be varied within very wide limits. Again, the point of application may be anywhere within the mill circuit, from the stone in the groundwood department, from the blow-pit of the chemical pulp department, from the stock-chest of the machine or beater room, or to the circulating white water within the mill, or to the issuing "white water" from any or all departments. In each and every case judgment alone dictates the proper procedure, so that the operation of the mill be not hindered, and so that the quality of final product be enhanced instead of injured, both as to strength, color and finish.

To make myself absolutely clear, I cite, as a special case, the following illustration,—in which I use a soluble salt of zinc for my soluble salt of a metal possessing an insoluble hydroxide; use lime for my soluble hydroxide; assume that the zinc compound is added at the head of each mill circuit, and that the lime is added to the issuing white water; and, assume, also, that the mill possesses three circuits, i. e., groundwood, sulphite, and the paper machine. Subsequently, I shall show some variations in this special case, but these are also optional variations illustrating the process, and I wish to make quite clear that I nowhere limit myself to these examples. Thus:

I add a soluble salt of zinc to the grinder pit and thus perform the entire operation of making groundwood, i. e., grinding, screening, and deckering, in a solution of zinc. The issuing white water discharged from this circuit will now evidently contain the major part of the added zinc, consequently, when lime is added to the white water a precipitate of zinc hydrate is produced. Even without the addition of lime separation will be more rapid than with white water free from zinc, but after the addition of lime separation by standing becomes exceedingly rapid, and the sediment is readily filtered if desired.

In the sulphite department we have an analogous condition. If white water for washing be used in the blow-pits, as is to-day general, then the zinc salt is added to the circulating white water; if pure water be used for washing purposes, then the zinc is added to it instead. Zinc salt is thus introduced at the head of the circuit so that the entire operation of washing, screening and deckering is performed in a dilute solution of zinc. The white water is now treated as described under groundwood (previously discussed) with analogous results.

If groundwood and sulphite have both been treated as herein described, then the contents of the stock-chest of the beater-room, or the mixing tank of a news mill, already contain some zinc brought in with the deckered stock, but if the quantity of zinc be inadequate to produce sufficiently rapid separation of the final white water, then more zinc is added. The entire operation of beating, jordaning, screening, and the final work of the paper machine wire, is thus performed in a dilute solution of zinc. The issuing white water is now treated with lime and settled or filtered, as before.

In all three divisions of the illustration cited there is obtained, as a result, a mixture of the solids, normally present in the particular type of white water used, together with the hydroxide of zinc produced in the final reaction with lime. In pulp and/or paper, where the presence of this hydroxide is not objectionable, such a mixture of pulp and zinc hydrate may simply be returned to the head of the circuit, becoming enmeshed in and finally becoming part of either the deckered stock and/or the final paper. In the event, however, that this is not desired, then I treat the above described product with an acid which may be hydrochloric, or cheaper yet, sulphuric, or, cheapest of all, sulphurous, or any other acid capable of converting the metallic hydrate into soluble form. The resultant mixture of pulp and soluble zinc salt is now ready for return to the mill circuit. The use of the zinc salt has thus been rendered cyclic, and no new addition of metal is required, save that rendered necessary by unavoidable losses. The only things that thus become part of the final product are the solids normally present in the white water under discussion. As still another variation, I may elect to treat the pulp-hydrate residue with carbonic acid, thus converting the hydrate into carbonate, and then return it to the mill circuit. Where the presence of a hydroxide is detrimental the reverse might be true of the corresponding carbonate, which in this case would result in whitening the final paper.

Having thus given my preferred illustration, I wish to state certain self-evident variations or applications which are inherent in, and therefore pertinent to, the practice of my invention. From the wide selection of metals possible, it follows that with a very cheap metal, such as iron, my invention might be used solely to prevent stream pollution, neither pulp nor metal being recovered in commercial form; the clear water to return to the stream being the object sought. Likewise, a type of utilization might be devised whereby the pulp were sacrificed and the metal recovered in the form of an oxide by burning the mixture of pulp and metallic hydrate recovered from the white water,— here again the object being principally avoidance of stream pollution, or economy of water, as water thus clarified could manifestly be returned to the mill supply. Furthermore, it is self-evident that by the practice of my invention, I give an entirely closed circuit to the pulp and paper mill in so far as "white water" is concerned. It will therefore become possible, thanks to this closed circuit, to exploit to its fullest extent the use of valuable metals in the mill circuit. It is well known that by such means the conditions of the mill circuit may be rendered acid or alkaline, oxidizing or reducing, hospitable to or inimical to bacterial life, etc., as we may desire; but the application of these principles to pulp and paper making have heretofore been retarded, if not entirely voided, by the consequent "white water" loss.

I claim:

1. In the treatment of white water, the method of adding to same a soluble salt of a metal possessing an insoluble hydroxide, adding a soluble hydroxide, separating the precipitate produced from the bulk of the water acted upon, adding suitable acid to dissolve the insoluble hydroxide in said precipitate, and returning the resultant product to the mill circuit.

2. In the treatment of white water, the method of adding to the mill circuit a soluble salt of a metal possessing an insoluble hydroxide, adding to the white water a soluble hydroxide, separating the precipitate produced from the bulk of the water acted upon, adding suitable acid to dissolve the insoluble hydroxide in said precipitate, and returning the resultant product to the mill circuit.

3. In the treatment of white water, the method of adding to the mill circuit a soluble hydroxide and to the white water a soluble salt of a metal possessing an insoluble hydroxide, separating the precipitate produced from the bulk of the water acted upon, adding suitable acid to dissolve the insoluble hydroxide in said precipitate, and returning the resultant product to the mill circuit.

4. In the treatment of white water, the method of adding to same a soluble salt of a metal possessing an insoluble hydroxide, adding a soluble hydroxide, separating the precipitate produced from the bulk of the water acted upon, carbonating the insoluble hydroxide in said precipitate, and returning the resultant product to the mill circuit.

5. In the treatment of white water, the method of adding to the mill circuit a soluble salt of a metal possessing an insoluble hydroxide, adding to the white water a soluble hydroxide, separating the precipitate produced from the bulk of the water acted upon, carbonating the insoluble hydroxide in said precipitate, and returning the resultant product to the mill circuit.

6. In the treatment of white water, the method of adding to the mill circuit a soluble hydroxide and to the white water a soluble salt of a metal possessing an insoluble hydroxide, separating the precipitate produced from the bulk of the water acted upon, carbonating the insoluble hydroxide in said precipitate, and returning the resultant product to the mill circuit.

7. In the treatment of white water, the method of adding to the mill circuit a soluble hydroxide and a soluble salt of a metal possessing an insoluble hydroxide, separating from the white water resulting therefrom such precipitate as passes into said white water, carbonating the insoluble hydroxide in said precipitate, and returning the resultant product to the mill circuit.

8. In the treatment of white water, the method of adding to same a soluble salt of a metal possessing an insoluble hydroxide, adding a soluble hydroxide, separating the precipitate produced from the bulk of the water acted upon, and burning the precipitate so obtained for the recovery of its metallic contents.

9. In the treatment of white water, the method of adding to the mill circuit a soluble salt of a metal possessing an insoluble hydroxide, adding to the white water a soluble hydroxide, separating the precipitate produced from the bulk of the water acted upon, and burning the precipitate so obtained for the recovery of its metallic contents.

10. In the treatment of white water, the method of adding to the mill circuit a soluble hydroxide and to the white water a soluble salt of a metal possessing an insoluble hydroxide, separating the precipitate produced from the bulk of the water acted upon, and burning the precipitate so obtained for the recovery of its metallic contents.

11. In the treatment of white water, the method of adding to the mill circuit a soluble hydroxide and a soluble salt of a metal possessing an insoluble hydroxide, separating from the white water resulting therefrom such precipitate as passes into said white water, and burning the precipitate so obtained for the recovery of its metallic contents.

12. In the treatment of white water, the method of adding to same a soluble salt of a metal possessing an insoluble hydroxide, adding a soluble hydroxide, separating the precipitate produced from the bulk of the water acted upon, adding acid to dissolve the insoluble hydroxide in said precipitate, separating the solution of metallic salt thus produced from the insoluble pulp residue, returning said solution of metallic salt to untreated white water, and returning the pulp residue to the mill circuit.

In testimony whereof I have set my signature.

ALFRED M. THOMSEN.